United States Patent [19]

Stein

[11] Patent Number: 5,288,406
[45] Date of Patent: Feb. 22, 1994

[54] PROCESS FOR BIOLOGICALLY PURIFYING WASTE WATERS

[75] Inventor: Theodor Stein, Kamen, Fed. Rep. of Germany

[73] Assignee: Schering Aktiengesellschaft, Bergkamen, Fed. Rep. of Germany

[21] Appl. No.: 865,830

[22] Filed: Apr. 1, 1992

Related U.S. Application Data

[63] Continuation of Ser. No. 650,045, Feb. 4, 1991, abandoned.

[30] Foreign Application Priority Data

Feb. 14, 1990 [DE] Fed. Rep. of Germany ....... 4004476

[51] Int. Cl.$^5$ ............................................. C02F 3/12
[52] U.S. Cl. ................................. 210/614; 210/624; 210/746; 210/903
[58] Field of Search ............... 210/610, 614, 621–624, 210/630, 631, 743, 746, 903

[56] References Cited

U.S. PATENT DOCUMENTS

| | | | |
|---|---|---|---|
| 3,725,258 | 4/1973 | Spector et al. | 210/614 |
| 4,277,342 | 7/1981 | Hayes et al. | 210/614 |
| 4,548,715 | 10/1985 | Stein | 210/614 |
| 4,659,471 | 4/1987 | Molin et al. | 210/614 |
| 4,731,185 | 3/1988 | Chen et al. | 210/614 |
| 4,810,386 | 3/1989 | Copa et al. | 210/616 |
| 4,849,108 | 7/1989 | de Wilde et al. | 210/624 |
| 4,859,341 | 8/1989 | Schreiber | 210/614 |

OTHER PUBLICATIONS

"Conversion and Elimination of Nitrogen in Wastewater", in Korrespondenz Abwasser, vol. 34, No. 1, pp. 77–85 (1987).

*Primary Examiner*—Thomas Wyse
*Attorney, Agent, or Firm*—Scully, Scott, Murphy & Presser

[57] ABSTRACT

A continuous process by which waste water containing low to high concentrations of organic constituents and total nitrogen is biologically purified to such an extent that the organic constituents are minimized, the content of total nitrogen is completely nitrified, if it exceeds the assimilation demand, and the nitrate formed is reduced by aerating the waste water or exposing it to oxygen while not exceeding a preselected redox potential. In the subject process, the expenditure on the oxygen introduction and the expenditure on the denitrification are minimized. Further, the amount of excess sludge produced is extremely small.

6 Claims, 1 Drawing Sheet

PROCESS FOR BIOLOGICALLY PURIFYING WASTE WATERS

This is a continuation of copending application Ser. No. 650,045 filed on Feb. 4, 1991 now abandoned.

BACKGROUND OF THE INVENTION

1. Field of the Invention

The invention relates to a continuous process by which waste waters containing low to high concentrations of organic constituents and total nitrogen (definition as given in H 12, the German standard method for the examination of water, waste water and sludge) are biologically purified to such an extent that the said organic constituents are minimized, the said content of total nitrogen is completely nitrified, if it exceeds the assimilation demand, and the nitrate formed is reduced.

In this process, the expenditure for the oxygen introduction, the expenditure for the denitrification and the quantity of excess sludge are minimized.

2. Description of the Prior Art

It is known that, when waste water is treated in an upstream denitrification stage, substantial proportions of the oxygen which serves to oxidize the nitrogen compounds can be recovered by recycling activated sludge from the settling basin of the activated sludge plant and/or by recycling waste water from the nitrification basin [1] [2] [3] [4]. (The numerals refer to the references listed at the end of the specification.)

It is furthermore known that the load of organic constituents flowing into the first stage is reduced by said denitrification and that a low $BOD_5$ sludge loading is necessary for a nitrification [1].

It is furthermore known that a complete denitrification of the water fed to the first stage is only possible if the COD feed/$NO_3$-nitrogen recycle ratio corresponding to the stoichiometry is 4 kg/kg or higher [2]. In the case of industrial waste waters, in particular, the ratio of organic load and total nitrogen is, however, often subject to large variations. If, during these variations, the COD feed/$NO_3$-nitrogen recycle ratio exceeds the above-mentioned amount of 4 kg/kg, the excess COD has to be biodegraded in the nitrification stage.

Surprisingly, it has now been found that it is possible to achieve both a complete denitrification and also a substantial biological reduction in the excess organic constituents by a controlled aeration of the first (denitrification) stage.

SUMMARY OF THE INVENTION

The invention accordingly relates to a process for biologically purifying waste waters containing low to high concentrations of organic constituents and total nitrogen, in which the waste water to be purified is aerated or exposed to oxygen in two stages, whereby a portion of the waste water/activated sludge mixture discharging from the second stage is recycled to the first stage, and the remainder of the waste water/activated sludge mixture discharging from the second biological reactor is separated in a settling tank, the settled activated sludge being recycled to the first stage and the purified waste water being removed, which process is characterized in that a preselected redox potential is not exceeded during the time the first stage is aerated or exposed to oxygen.

Preferably, the aeration or oxygen supply in the first stage is regulated by means of the redox potential. In doing so, there is preferably maintained a redox potential, $E_h$ (pH 7), below +100 mV, preferably in the range of from about 0 to about 50 mV.

Preferably, during the aeration or exposure to oxygen in the second stage, a specified range is maintained for the oxygen content, in particular from about 0.5 to about 10 mg/l, preferably about 2 to about 4 mg/l.

It is advantageous to regulate the aeration or oxygen supply in the second stage by means of the measured oxygen content.

Denitrification in the presence of atmospheric oxygen is not possible according to some prior art [1] [3] [4]. In other prior art publications, reference is made to possible denitrification utilizing air [5] [6], but no definite conditions are specified for conducting the process. In addition, some references caution against an accumulation of nitrite [6] [7] [8].

Surprisingly, it has been found that denitrification in an industrially applicable degradation process with simultaneous gasification with air or oxygen is possible under certain conditions without encountering a harmful accumulation of nitrite.

In summary, the process according to the invention offers the following advantages:

1. In addition to reducing the organic load by denitrifying the nitrogen compounds, the oxygen introduced oxidizes such a large proportion of the organic load that the organic loading of the second stage is minimized.
2. With a preselected low redox potential, the oxygen transfer in the first stage is appreciably higher than in the case of a full aerobic aeration. Depending on the height of the water column, the oxygen utilization may amount to up to 90%. As a result, substantial proportions of the organic constituents are oxidized with lower aeration costs than in the case of the standard process. The design of the aeration in the second stage consequently depends mainly on the oxygen demand for the nitrification.
3. The volume of the nitrification basin (first stage) can be minimized; it should be designed primarily in accordance with the data of the expected loading of the biomass and the total nitrogen which is to be oxidized.
4. The formation of excess sludge is low (it is less than 0.2 kg of dried solid matter/kg of COD degraded) since the sludge loading in the nitrification basin (second stage) is low.

In addition, the process is also applicable and effective in the case of waste waters which contain such low levels of nitrogen compounds that the physiological demand of the bacteria has to be satisfied by adding nitrogen compounds.

DESCRIPTION OF THE PREFERRED EMBODIMENTS

Figure 1:
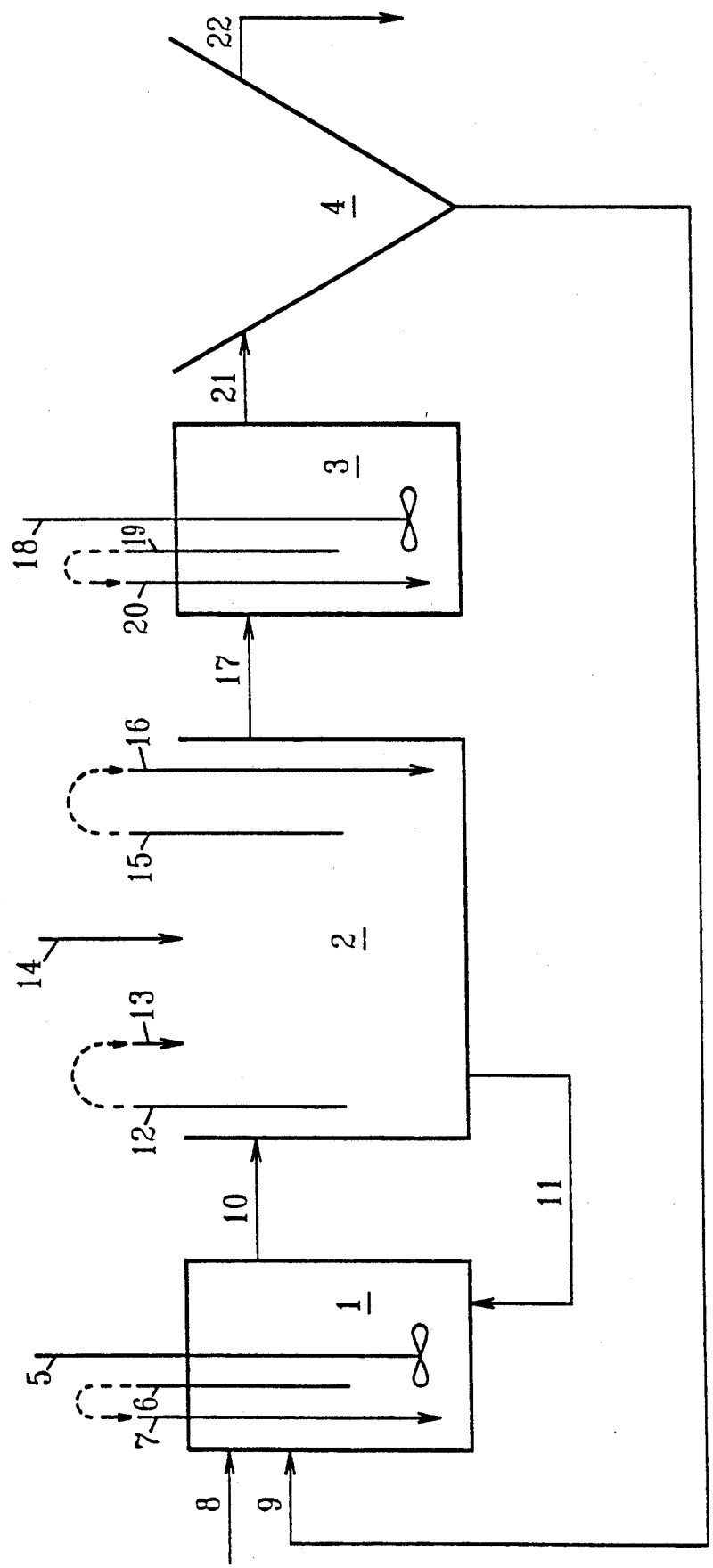
FIG. 1 presents a flowplan of an embodiment of the process of the subject invention.

The mode of operation of the process according to the invention and the achieved advantages are explained in greater detail below.

The waste water to be purified, the waste water/activated sludge mixture from the second stage (biological reactor 2) and the settled activated sludge from the settling tank are fed to the first stage (biological reactor 1, equipped with a device for mixing, an aeration device and a device for measuring the redox potential) and all the components are well mixed. In this process, the organic constituents of the waste water are absorbed by the organisms of the activated sludge and reacted with the oxygen of the nitrate to form carbon dioxide and hydrogen. The redox potential established depends on the ratio of the nitrate oxygen originating from the waste water/activated sludge mixture recycled from the second stage to the COD content (chemical oxygen demand as an expression of the concentration of the organic constituents) in the feed water. If the COD feed exceeds the supply of nitrate oxygen, the redox potential drops below the specified value. In the preferred embodiment of the process according to the invention, oxygen introduction is controlled by means of the redox potential which regulates the flow of air and/or oxygen. The components of organic load remaining after the oxidation by means of denitrification are now oxidized by the organisms in the activated sludge with the aid of free oxygen. At the same time, the redox potential rises until the specified value for the redox potential is reached and consequently leads again to a reduction in the air/oxygen feed.

The redox potential value to be maintained should be below an $E_h$ (pH) of about +100 mV, preferably in the range of from about 0 to about 50 mV.

The redox potential is advantageously measured with a measuring cell comprising a platinum electrode and a reference electrode (for example, calomel electrode or silver/silver chloride electrode).

This achieves the result that
a) substantial proportions of the oxygen used to oxidize the amine/ammonia nitrogen are recovered,
b) reducing the acid equivalent of the nitrate saves substantial amounts of neutralization agent,
c) biological oxidation eliminates the major portion of the organic load of the waste water in biological reactor 1 and consequently,
d) only small amounts of organic load flow into downstream biological reactor 2 and this stage is essentially used for nitrification, even when the COD supply in the feed to the entire system substantially exceeds the nitrate oxygen demand from the recycle from biological reactor 2 to biological reactor 1,
e) the COD value is reduced by about 80%.

In biological reactor 2, the incoming total nitrogen is oxidized to nitrate and the residual COD content is reduced further.

Biological reactor 2 is equipped with an aeration device, a device for measuring the oxygen content in the aqueous phase, a device for measuring the pH and a device for the metered addition of neutralization agents.

In biological reactor 2, the incoming total nitrogen is oxidized to nitrate and the residual COD concentration is reduced further. In order to achieve complete nitrification, it is necessary for a minimum content of oxygen, which in experiments was 3 mg $O_2$/l, to be dissolved in the waste water. Below this concentration, the nitrification was not always complete.

The volumetric flows should be regulated as a function of the concentration of the waste water constituents so that, in biological reactor 1, a volume loading of organic constituents expressed as COD does not substantially exceed a value of about 15 kg COD/$m^3$.d, but should preferably be in a range of about 10 kg COD/$m^3$.d in order to reliably accommodate variations in the waste water concentration. (If complete nitrification is not desired or at least substantial nitrification is desired, it is possible, depending on the characteristics of the waste water, to set the COD volume loading of biological reactor 1 at a higher level.) No upper limit for the nitrogen volume loading in biological reactor 2 has so far been determined. Volume loadings of up to about 0.4 kg of total nitrogen/$m^3$.d were completely nitrified.

The recycle of the activated sludge/water mixture from biological reactor 2 to biological reactor 1 may vary within a wide range. It is expediently calculated and so selected that an operating cost optimum, which is dependent on the pumping energy to be delivered, on the one hand, and on the costs of the neutralizing agent and the costs of the reducing agent in biological reactor 3, on the other hand, is achieved.

If necessary, the quantity of nitrate which exceeds the level of denitrification which can be obtained in biological reactor 1 can additionally be reduced in a third stage (biological reactor 3) by adding a biologically oxidizable substance (for example, methanol), based on the specified redox potential, so that, in the event the specified value of the redox potential is exceeded or not achieved, the amount of the said substance supplied is reduced or increased, as required.

For this purpose, biological reactor 3 is equipped with a device for mixing, a device for measuring the redox potential and a device for the metered addition of a biologically oxidizable material for the purpose of denitrification. Air should not have access to this reactor.

This achieves the result that
a) the purified waste water is free of nitrate and/or nitrite,
b) problems in the settling basin due to denitrification processes which may result in partial flotation of the settled sludge caused by formation of nitrogen bubbles are avoided.

In the subsequent settling basin, the activated sludge/waste water mixture is separated in a known manner. The purified waste water is drained off, and the settled activated sludge is recycled to biological reactor 1.

The proportion of sludge recycled is calculated in a known manner as a function of the amount of waste water (recycle/sludge ratio) introduced and the settling behavior.

Particularly good results can be achieved if the waste water is pretreated partially aerobically as in EP 0,038,017 (U.S. Pat. No. 4,548,715). In that case, the waste water constituents are oxidatively reduced by approximately 60% with the aid of disperse, nonflocculated bacteria using minimum aeration regulated by means of the redox potential. Some of the waste water constituents are converted into disperse bacteria which leaves the system together with the treated waste water.

When this waste water pretreated in this way is then subjected to the process according to the invention, both the disperse bacteria and also the dissolved organic residues are minimized to such an extent that efficiencies of >80% are achieved for the COD reduction and of >90% for the $BOD_5$ reduction.

Based on the entire process, i.e., partial aerobic pretreatment plus the process according to the invention, the efficiency of the COD reduction can be increased to >90% and that of the $BOD_5$ reduction to >95%.

With a synthetic waste water it was found that the nitrification in biological reactor 2 was always complete up to a COD volume loading in biological reactor 1 of 17.5 g COD/l.d when the pH was between 7.5 and 8.3 and the temperature was 25° C. At the same time, it was possible to reduce the hydraulic retention time in biological reactor 1 to one hour. It was also possible to increase the total nitrogen loading of biological reactor 2 to 310 mg N/l.d without the nitrification being restricted. If the said limit of the COD volume loading of biological reactor 1 of 17.5 g COD/l.d was exceeded, complete nitrification was no longer achieved. Apparently, it was adversely affected by a higher feed of organic constituents to biological reactor 2.

With other waste waters, lower limits for the COD volume loading in the first stage were found to be the limitation for complete nitrification.

It can, therefore, be assumed that the conditions for complete nitrification have to be redetermined for each application of the process according to the invention.

On the other hand, if complete nitrification is dispensed with and the COD reduction is limited to COD volume loadings of up to about 30 g COD/l.d in biological reactor 1, a substantially higher loading of the system was possible; in this case, the COD reduction of the entire system was >90%.

At the same time it was found that with the subject process certain organic compounds cannot be biologically attacked at the low redox potentials sought in biological reactor 1. These compounds include aromatic compounds, for example, toluene and tetrahydrofuran, and chlorinated hydrocarbons, for example, ethylene chloride and dichloromethane.

It was found furthermore that certain metabolites which do not occur in a full aerobic process are produced at the low redox potentials sought in biological reactor 1. These compounds include ethene ($C_2H_4$) and carbon monoxide (CO). It is furthermore known from the literature that the nitrate reaction chain passes through the stages $NO \rightarrow NO_2 \rightarrow N_2O \rightarrow N_2$.

It may be expected of these compounds (aromatics, chlorinated hydrocarbons, ethene, CO, $N_2O$) are present in measurable concentrations in the exhaust gas of biological reactor 1.

The exhaust gas of biological reactor 1 will, therefore, be advantageously introduced into biological reactor 2 so that these constituents are dissolved in the aqueous phase of biological reactor 2, adsorbed by the biomass and oxidized biologically, in order to minimize the emissions from the process. This may be achieved by either adding the exhaust gas of biological reactor 1 to the gasification air of biological reactor 2 or by introducing it by means of a separate gasification device into the aqueous phase of biological reactor 2.

EXAMPLE (Refer to FIG. 1)

A waste water from the chemical-pharmaceutical industry, partially pretreated in accordance with EP 0,038,017 (U.S. Pat. No. 4,548,715), is fed to an apparatus comprising biological reactor 1 (1) having a capacity of 10 l and equipped with a stirrer (5), a redox electrode (6) and an aeration device (7).

Waste water (8) having a COD concentration of 1,000 mg/l to 2,500 mg/l, a $BOD_5$ concentration of 400 to 700 mg/l and a total nitrogen content of 120 to 100 mg/l is fed to said biological reactor 1 (1) at a flow rate of 48 l/d.

A recycle (11) of waste water/activated sludge mixture of 30 l/d and also a mixture of settled activated sludge and waste water (9) from the settling tank (4) in an amount of 10 l/d is introduced into the biological reactor 1 (1).

Air is fed to said biological reactor 1 (1) as a function of the redox potential in a manner such that a potential of $E_h$ (pH 7) = +20 mV ± 10 mV is maintained (as measured by an electrode supplied by Ingold, Pt 4805-60).

The waste water/activated sludge mixture (10) then flows into biological reactor 2 (2) which has a capacity of 36.8 l. The latter is equipped with a pH electrode (12), a metering device for neutralization agent (13), an oxygen electrode (15) and an aeration device (16).

Air is introduced into biological reactor 2 as a function of the measured oxygen content in a manner such that the concentration does not fall below 3 mg $P_2$/l.

Neutralization agent is introduced into biological reactor 2 as a function of the measured pH in a manner such that a pH of approximately 8.0 is maintained.

The waste water/activated sludge mixture from biological reactor 2 (17) is introduced into the biological reactor 3 (3) which has a capacity of 5 l. The latter is equipped with a stirrer (18), a redox electrode (19) and a methanol adding device (20).

Methanol is added as a function of the redox potential so as not to exceed a potential of $E_h$ (pH 7) = +60 mV and not to fall below a potential of $E_h$ (pH 7) = +40 mV.

The waste water/activated sludge mixture from reactor 3 (21) then flows into a settling basin (4) which has a capacity of 33 l. Here the activated sludge separates from the waste water and is recycled as flow (9) to biological reactor 1 (1), as described above.

The purified water separated from the activated sludge in the settling tank (4) drains off (22).

The waste water flows are examined as follows:

The feed water (8) for COD, $BOD_5$, total nitrogen and phosphate content.

The waste water/activated sludge mixture (10) from reactor 1 (1) to reactor 2 (2) for the COD of the settled sample and for the content of nitrite $NO_2^-$.

The waste water of the feed flow (17) to biological reactor 3 for nitrite $NO_2^-$ and nitrate $NO_3^-$.

The drainage water from the entire system (22) for COD, $BOD_5$, ammonium ion $NH_4^+$, nitrate $NO_3^-$ and nitrite $NO_2^-$.

The activated sludge content of the mixture in reactor 2 (2), in g DSM (dry solid matter)/l and the sediment volume in ml/l are determined and the microscope picture of the activated sludge are examined. The content of dry solid matter found is between 9 and 15 g/l, with a calcination residue of between 40 and 45%.

The waste water passes from the biological reactor 1 (1) with COD values of between 230 and 470 mg/l. The nitrite $NO_2^-$ value is always below 0.05 mg/l (limit of detection).

The waste water passing from biological reactor 2 has a nitrate content of between 30 mg/l and 215 mg/l.

The waste water draining from the entire system has a COD value of between 170 and 330 mg/l and a $BOD_5$ value of between <5 and 100 mg/l, the nitrite and nitrate content and also the ammonium content being below the limit of detection (<2 mg $NH_4$ N/l).

Consequently, a COD degradation of more than 80%, a $BOD_5$ degradation of more than 90%, a nitrification of more than 99% and a denitrification of >99% are demonstrated for the process of the subject invention.

The production of excess sludge is reduced to below 0.1 g/g COD.

References

[1] ATV "Lehr- und Handbuch der Abwassertechnik" (Textbook and Manual of Waste Water Engineering"), 3rd edition, Vol. IV (1985), Verlag Ernst & Sohn, (Pages 307-317).

[2] A. Esener, et al., "Pretreatment Scheme Eases Waste Water Biotreatment", Oil and Gas Journal (1987), (Pages 40-43).

[3] H. G. Schlegel, "Allgemeine Mikrobiologie" ("General Microbiology"), 6th edition, G. Thieme Verlag, Stuttgart, New York (1985), (Pages 302-306).

[4] Yasushi K., et al., "Inhibition of Denitrification by Oxygen in Paracoccus denitrificans", J. Ferment. Technol. Vol. 63, No. 5 (1985), (Pages 437-442).

[5] S. Christensen, J. Tiedge, "Oxygen Control Prevents Denitrifiers and Barley Plant Roots from Directly Competing for Nitrate", FEMS microbiol. Ecology 53 (1988), (Pages 217-221).

[6] J. Meiberg, et al., "Effect of Dissolved Oxygen Tension on the Metabolism of Methylated Amines in Hypomicrobium X in the Absence and Presence of Nitrate: Evidence for Aerobic Denitrification", J. General Microbiol. Vol. 120 (1980), (Pages 453-463).

[7] M. Samuelsson, et al., "Heat Production by the Denitrifying Bacterium Pseudomonas fluorescens and the Dissimilatory Ammonium-Producing Bacterium Pseudomonas putrefaciens During Anaerobic Growth with Nitrate as Electron Acceptor", Appl. Environm. Microbiol. Vol. 54 (1988), (Pages 2220-2225).

[8] D. Hernandes, J. Rowe, "Oxygen Regulation of Nitrate Uptake in Denitrifying Pseudomonas aeruginosa". Appl. Environm. Microbiol. Vol. 53 (1987), (Pages 745-750).

What is claimed is:

1. In a process for biologically purifying waste waters containing low to high concentrations of organic constituents and total nitrogen in which said waste water to be purified is aerated or exposed to oxygen in two stages, a portion of the waste water/activated sludge mixture draining from the second stage is recycled to the first stage, and the remainder of the waste water/activated sludge mixture draining from the second stage is separated in a settling tank, and the settled activated sludge is recycled to the first stage and the purified waste water is removed, the improvement which comprises mixing the components of the first stage and maintaining a redox potential $E_h$ (pH 7) of below $+100$ mV in the first stage while the components thereof are aerated or exposed to oxygen.

2. A process according to claim 1 wherein the aeration or oxygen supply in the first stage is regulated by means of the redox potential.

3. A process according to claim 1 or 2 wherein the redox potential $E_h$ (pH 7) is in the range of about 0 to about 50 mV.

4. A process according to claim 1 or 2 wherein during the aeration or exposure of the second stage to oxygen, an oxygen content in the range of about 0.5 to about 10 mg/l is maintained.

5. A process according to claim 4 wherein the oxygen content is in the range of about 2 to about 4 mg/l.

6. A process according to claim 4 wherein the aeration or oxygen supply in the second stage is regulated by means of the measured oxygen content in the second stage.

* * * * *

UNITED STATES PATENT AND TRADEMARK OFFICE
CERTIFICATE OF CORRECTION

PATENT NO. : 5,288,406

DATED : February 22, 1994

INVENTOR(S) : Theodor Stein

It is certified that error appears in the above-indentified patent and that said Letters Patent is hereby corrected as shown below:

Column 6, line 14: "$P_2/1$" should read --$O_2/1$--

Column 8, line 3: insert the following;

--Symbols in Figure 1:

1. Biological reactor 1 (1st stage)
2. Biological reactor 2 (2nd stage)
3. Biological reactor 3 (3rd stage)
4. Settling tank
5. Stirrer in 1st stage
6. Redox electrode in 1st stage
7. Air feed to 1st stage (controlled by 6.)
8. Crude waste water feed
9. Recycle of settled activated sludge
10. Feed to 2nd stage
11. Recycle from the 2nd stage to the 1st stage
12. pH electrode in 2nd stage

UNITED STATES PATENT AND TRADEMARK OFFICE
CERTIFICATE OF CORRECTION

PATENT NO. : 5,288,406
DATED : February 22, 1994
INVENTOR(S) : Theodor Stein

It is certified that error appears in the above-indentified patent and that said Letters Patent is hereby corrected as shown below:

13. Addition of neutralizing agent (controlled by 12.)
14. Addition of nutrient salts (only if required)
15. Oxygen electrode in 2nd stage
16. Air feed to 2nd stage (controlled by 15.)
17. Feed to 3rd stage
18. Stirrer in 3rd stage
19. Redox electrode in 3rd stage
20. Addition of organic material (e.g. methanol) for the purpose of denitrification, as a function of 19.
21. Feed to settling tank
22. Outflow of purified waste water--

Signed and Sealed this

Twenty-third Day of May, 1995

Attest:

BRUCE LEHMAN

Attesting Officer

Commissioner of Patents and Trademarks